Patented Feb. 8, 1927.

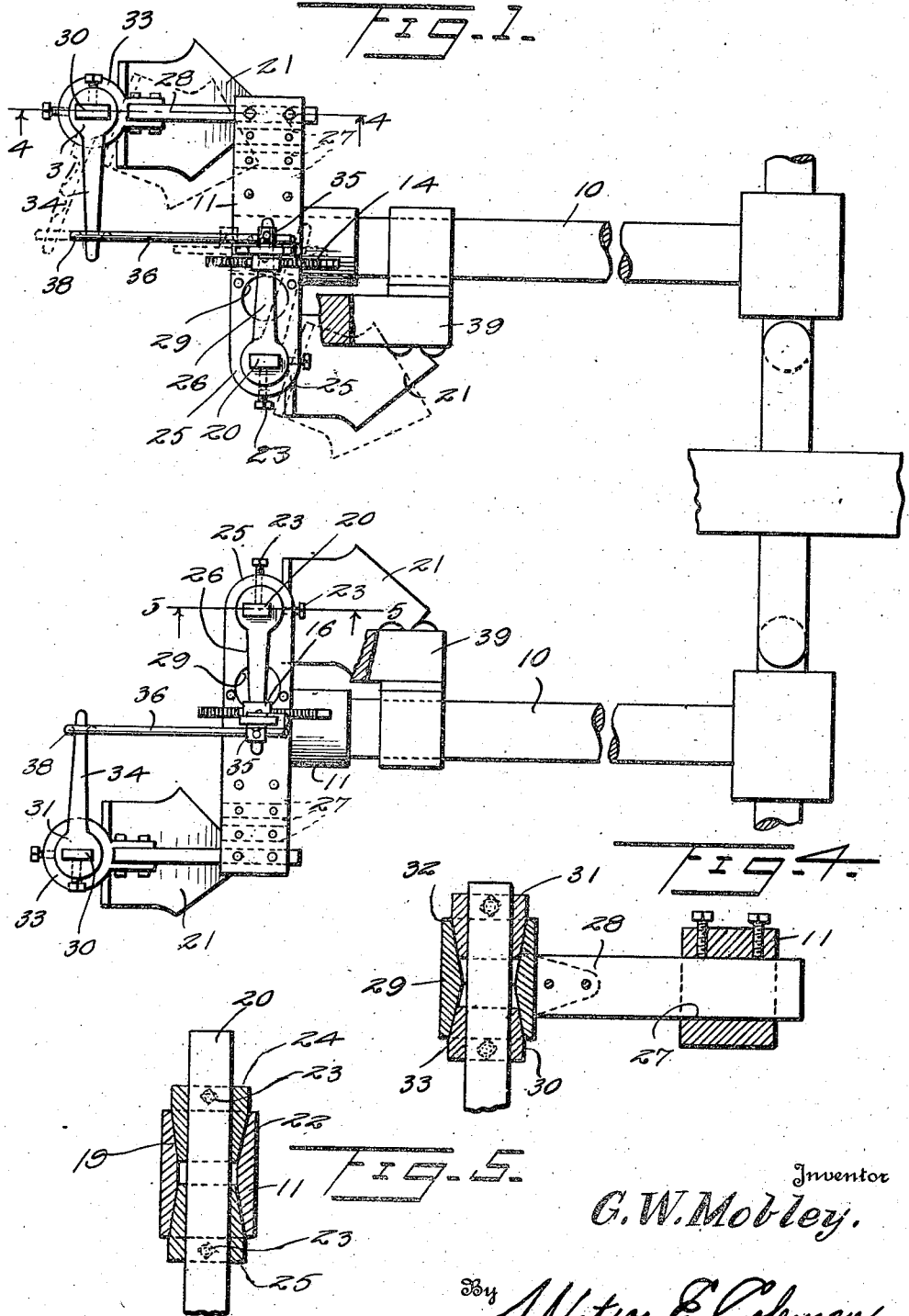

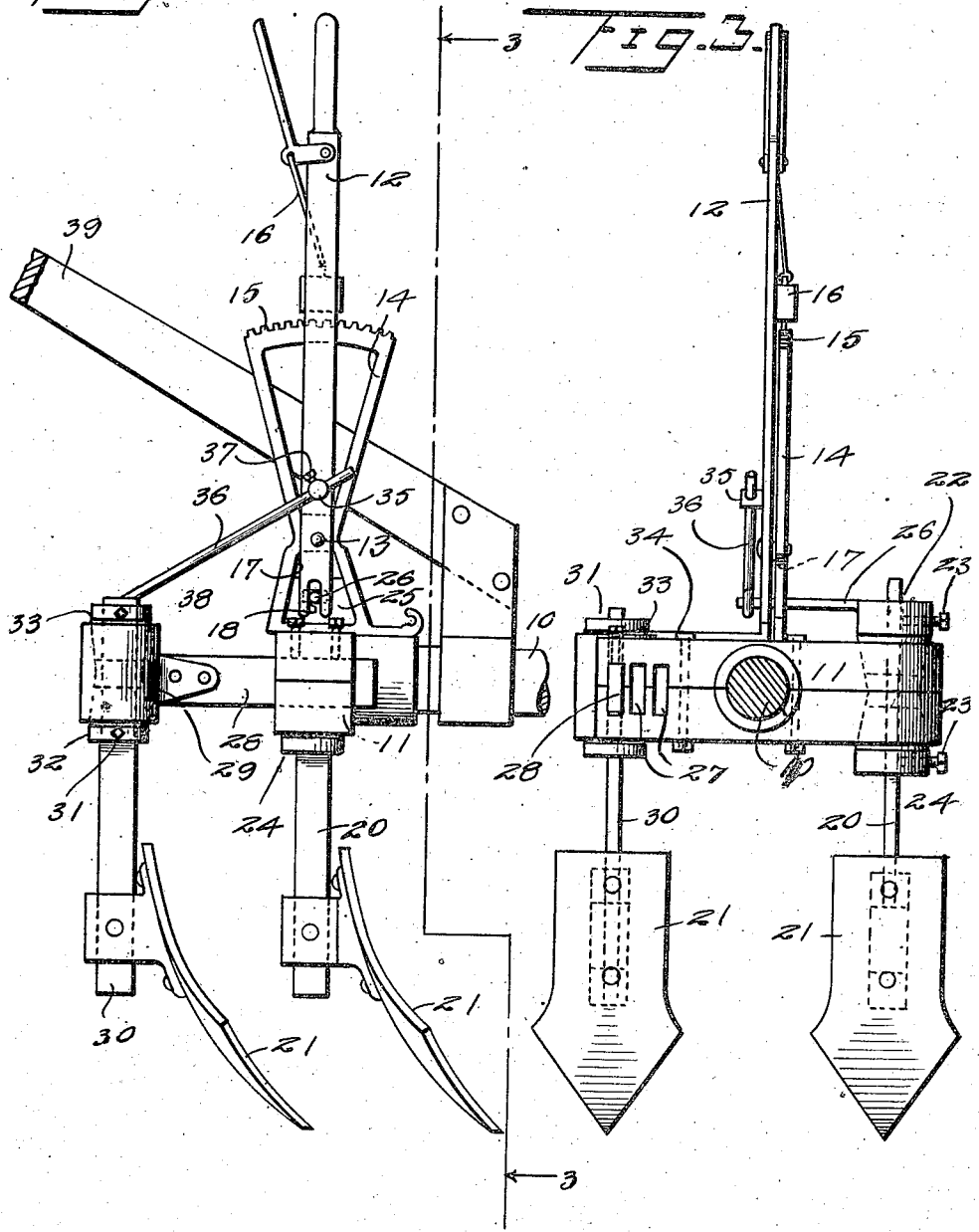

1,616,595

UNITED STATES PATENT OFFICE.

GEORGE W. MOBLEY, OF WAYNESBORO, GEORGIA.

CULTIVATOR.

Application filed June 10, 1926. Serial No. 115,077.

This invention relates to improvements in cultivators and more particularly to an improvement in the method of mounting the cultivator teeth or shares so that they may be very readily adjusted toward and away from one another.

An important object of the invention is to produce a device of this character which eliminates the necessity for nuts, bolts and the like.

A still further object of the invention is to provide a device of this character so constructed that the collection of dust and dirt in the working parts is eliminated and the life of the mounting thus extended.

A further object of the invention is to provide a device of this character which may be very readily and cheaply produced and which may be easily applied to cultivators as at present constructed.

A further object of the invention is to provide a device of this character whereby the set of the cultivator teeth or shares may be readily adjusted to permit use of the cultivator in middles of different widths or plant rows, in the working of which the cultivator implements must be differently spaced.

These and other objects I attain by the construction shown in the accompanying drawings, wherein for the purpose of illustration is shown a preferred embodiment of my invention and wherein:

Figure 1 is a fragmentary plan view of a cultivator embodying by invention, two of the cultivator implements being illustrated as in shifted position in dotted lines;

Figure 2 is a side elevation of the blade holding elements;

Figure 3 is a section on the line 3—3 of Figure 2;

Figure 4 is a section on the line 4—4 of Figure 1;

Figure 5 is a section on the line 5—5 of Figure 1.

Referring now more particularly to the drawings, I have illustrated a cultivator frame of a well known type including parallel rearwardly extending cultivator beams 10. To the rear end of each of these beams, I secure a T-head 11 which is horizontally disposed and extends transversely of the vehicle. At the approximate center of this T-head, I mount a lever 12 swinging in a plane extending longitudinally of the vehicle upon a pivot 13 spaced above the upper surface of the head and mounted in a bracket 14, the upper end of which is extended above the pivot and formed as a segment 15 for coaction with a latch 16 mounted upon and controllable from the upper end of the lever. The bracket 14 below the pivot 13 is provided with an opening 17 across which the lower end of the lever operates and this lower end of the lever is forked, as at 18.

At the inner side of the head, I form a plurality of vertical openings 19 spaced longitudinally of the head and each constructed to permit the passage of the helve 20 of a ground working implement or share 21. The helve of this ground working implement is preferably in the form of a flat bar and is surrounded by lower and upper collars 24 and 25 secured in position by set-screws 23. The collar 25 which abuts the upper surface of the head 11 has formed thereon an arm 26 which projects through the opening 17 and engages in the notch 18 of the lever 12.

The opposite end of the head 11 is formed with a longitudinally spaced series of transversely extending horizontally directed openings 27 adapted to interchangeably receive the forward end of an arm 28, the rear end of which has attached thereto a vertically directed eye 29 having a vertical opening 30 similar to the opening 19. Through this eye is directed a second helve 31 similar to the helve 20 and having associated therewith lower and upper trunco-conical collars 32 and 33 similar to the collars 24 and 25. The arm 34 of the collar 33 extends transversely of the vehicle, so that its end longitudinally aligns with the lever 12. At points spaced above the pivot 13 a distance corresponding to the distance between the pivot and arm 26, the lever has rotatably mounted thereon a stud 35 having an opening for the passage of a longitudinally extending link 36 and a set-screw 37 for holding this link in adjusted positions. The rear end of this link has an eye 38 through which the end of the arm 34 is directed.

It will be obvious that since the arms 26 and 34 extend in opposite directions and are connected with the lever at opposite sides of the pivot thereof, a movement of the lever will result in corresponding movements of the helves 20 and 30 in the same direction, thereby swinging with these helves the ground working implements 21 connected thereto to move them toward or away from the center of the cultivator. It will also be obvious that this adjustment can be made at either side of the cultivator to accommodate a sudden widening or displacement of the plants of a row without the necessity of the operator stopping the cultivator or releasing more than one of the handles 39 thereof. While the structure hereinbefore set forth has been illustrated with the particular type of cultivator, it is obviously capable of use with cultivators of other types. Since certain changes are possible in the construction and arrangement of the various parts hereinbefore illustrated, I do not limit myself to such specific structure except as hereinafter claimed.

I claim:—

1. In a cultivator, a beam, a head carried by the beam and extending transversely of the cultivator, a lever pivotally mounted upon the head at the center thereof, helves for ground working implements rotatably supported from the head at opposite sides of the lever, an arm rigidly secured to each helve and connections between the lever and said arms at opposite sides of the pivot of the lever.

2. In a cultivator, a beam, a head carried by the beam and extending transversely of the cultivator, a lever pivotally mounted upon the head at the center thereof, helves for ground working implements rotatably supported from the head at opposite sides of the lever, each helve having an arm, one end of the lever having an opening through which one of the arms extends, the connection of the second arm with the lever being a link.

3. In a cultivator, a beam, a head carried by the beam and extending transversely of the cultivator, a lever pivotally mounted upon the head at the center thereof, helves for ground working implements rotatably supported from the head at opposite sides of the lever and adjustable longitudinally of the head toward and away from the lever, an arm rigidly secured to each helve and connections between the lever and said arms at opposite sides of the pivot of the lever.

4. In a cultivator, a beam, a head carried by the beam and extending transversely of the cultivator, a lever pivotally mounted upon the head at the center thereof, said head at one side of the lever having a series of longitudinally spaced vertically directed openings and at the opposite side of the lever having a series of longitudinally spaced horizontally directed openings, a ground working implement having a helve selectively rotatably engageable in any of the first named series of openings, an arm selectively engageable in the second series of openings and having a vertically directed eye, a second ground working implement having a helve rotatably engaged in the eye of said arm, an arm rigidly secured to each helve and connections between the lever and the arms of the helves at opposite sides of the pivot of the lever.

5. In a cultivator, a beam, a head carried by the beam and extending transversely of the cultivator, a lever pivotally mounted upon the head at the center thereof, said head at one side of the lever having a series of longitudinally spaced vertically directed openings and at the opposite side of the lever having a series of longitudinally spaced horizontally directed openings, a ground working implement having a helve selectively rotatably engageable in any of the first named series of openings, an arm selectively engageable in the second series of openings and having a vertically directed eye, a second ground working implement having a helve rotatably engaged in the eye of said arm, an arm rigidly secured to each helve, connections between the lever and the arms of the helves at opposite sides of the pivot of the lever and means for securing the first named arm in adjusted positions in an opening of the series in which it is engaged.

6. In a cultivator, a beam, a head carried by the beam and extending transversely of the cultivator, a lever pivotally mounted upon the head at the center thereof, said head at one side of the lever having a series of longitudinally spaced vertically directed openings and at the opposite side of the lever having a series of longitudinally spaced horizontally directed openings, a ground working implement having a helve selectively rotatably engageable in any of the first named series of openings, an arm selectively engageable in the second series of openings and having a vertically directed eye, a second ground working implement having a helve rotatably engaged in the eye of said arm, an arm rigidly secured to each helve, connections between the lever and the arms of the helves at opposite sides of the pivot of the lever and means for securing the first named arm in adjusted positions in an opening of the series in which it is engaged, the arm of the second helve having a link connection with the lever, said link being adjustable as to effective length.

7. In a cultivator, a beam, a head carried by the beam and extending transversely of the cultivator, a lever pivotally mounted upon the head at the center thereof, helves for ground working implements rotatably supported from the head at opposite sides of the lever, an arm rigidly secured to each helve and connections between the lever and said arms at opposite sides of the pivot of the lever, there being a bracket upon which the lever is pivoted at a point spaced above the upper surface of the head, the bracket having an opening through which one of said arms is directed, the lower end of the lever having a notch receiving said arm.

In testimony whereof I hereunto affix my signature.

GEORGE W. MOBLEY.